US006519529B2

(12) United States Patent
Doyle

(10) Patent No.: US 6,519,529 B2
(45) Date of Patent: Feb. 11, 2003

(54) INTERMODAL MOVEMENT STATUS MONITORING SYSTEM

(75) Inventor: Thomas F. Doyle, San Diego, CA (US)

(73) Assignee: Terion, Incorporated, Melbourne, FL (US)

(*) Notice: Subject to any disclaimer, the term of this patent is extended or adjusted under 35 U.S.C. 154(b) by 0 days.

(21) Appl. No.: 09/845,056

(22) Filed: Apr. 27, 2001

(65) Prior Publication Data

US 2002/0052687 A1 May 2, 2002

Related U.S. Application Data

(60) Provisional application No. 60/199,953, filed on Apr. 27, 2000.

(51) Int. Cl.[7] .................................................. G01C 21/00
(52) U.S. Cl. ........................................ 701/213; 701/200
(58) Field of Search ................................. 701/200, 201, 701/213, 214, 24; 342/357.06, 357.07, 357.08, 357.09, 357.1

(56) References Cited

U.S. PATENT DOCUMENTS 4,750,197 A 6/1988 Denekamp et al. ........... 379/58
4,897,642 A 1/1990 DiLullo et al. ........ 340/825.06
5,734,963 A 3/1998 Fitzgerald et al. ......... 455/31.2
5,832,394 A 11/1998 Wortham ....................... 701/1
5,867,801 A 2/1999 Denny ......................... 701/35
5,918,180 A * 6/1999 Dimino ...................... 455/456
5,995,804 A 11/1999 Rootsey et al. ............ 455/11.1

* cited by examiner

*Primary Examiner*—Yonel Beaulieu
(74) *Attorney, Agent, or Firm*—Hamilton, Brook, Smith & Reynolds, P.C.

(57) ABSTRACT

A system for tracking and monitoring the intermodal status of cargo trailers. In addition to the information provided by a Global Positioning System (GPS) unit, the system monitors the status of various sensors on the trailer. The GPS unit provides the location and velocity of a trailer. A wheel monitoring unit provides the status of the wheels of the trailer, specifically whether there is rotation of the wheels or not. Anti-lock braking systems are used to provide signal information indicative of the wheel rotation status. An independent wheel rotation sensor is also used to provide the wheel rotation status. A computer processor determines the intermodal movement status of the trailer using the wheel rotation status and the location and velocity information.

22 Claims, 5 Drawing Sheets

INTERMODAL MOVEMENT STATUS MONITORING SYSTEM

RELATED APPLICATIONS

This application claims the benefit of the U.S. Provisional Application No. 60/199,953, filed Apr. 27, 2000, the entire teachings of which are incorporated herein by reference.

BACKGROUND OF THE INVENTION

The present invention relates to tracking and monitoring the intermodal movement status of mobile assets such as cargo containers.

Mobile asset management is a major concern in various transportation industries such as trucking, railroad and rental cars. In the trucking industry, the asset manager has to keep track of the status and location of each tractor and trailer in a fleet. The asset manager should also know whether each asset is in service (i.e., being transported by a tractor or other means) or out of service (i.e., not being transported by a tractor or any other transportation means). The asset manager should have similar information with respect to whether each tractor in the fleet is hauling a trailer or is not, and thus available for service. The asset manager should also be able to monitor the progress of each tractor and trailer according to plan for scheduling purposes.

Systems for tracking and monitoring mobile assets for fleet management are generally known. These systems typically include various sensors and communication units. Trucking companies usually install the sensors and communication units on the mobile units, e.g., the tractor or cargo trailers. The sensor determines the status and location, checks for proper operating conditions and any misuse, and monitors the progress of each tractor and coupled trailer for scheduling and security purposes.

In the transportation industry, it is also common for a trailer to be moved by railroad cars, known as piggybacking. When this happens, there is no tractor hauling the trailer, and thus no driver. As a result, there is a lack of security that the driver normally provides when the tractor is hauling the trailer. In addition, since the tractor equipped with tracking and monitoring system devices is not coupled to the trailer, the owner of the trailer loses visibility of the trailer's location and status while the trailer is in transit on railroad cars. Although some railroads provide status messages to the owners of trailers, this is not always available or reliable.

SUMMARY OF THE INVENTION

There is a need to monitor equipment and shipments when intermodal move is in progress, i.e., in transit by rail. In addition, there is a need for frequent location reports of the trailers during such a transit for more efficient asset management.

The present invention is a system for tracking and monitoring the intermodal status of cargo trailers. The system of the present invention uses various asset tracking and monitoring sensors on a trailer, including a location determining sensor and a wheel movement sensor. The present invention determines the intermodal status of the trailer with a high level of reliability. In addition, the system of the present invention can be incorporated with existing complete cargo tracking systems to provide the intermodal status information with other monitoring and reporting features.

The system includes a sensor for providing data relating to the movement of the trailer and a wheel monitoring unit for monitoring the status of the trailer wheels. Wireless radio communication equipment transmits the trailer movement and wheel information data to a central station. A communications system, such as a cellular telephone system or paging system, is used to provide the wireless data links required between the trailer and central station. The central station receives the trailer information data and inputs the data to a processor. The processor determines the intermodal movement status using the trailer movement and wheel rotation data.

More specifically, the processor receives location or velocity information from the location sensor in combination with wheel rotation information, in particular whether there is rotation of the wheels or not. For example, if the location sensor indicates that the trailer is moving, but the wheel monitoring unit indicates that the wheels are not rotating, then the processor determines that an intermodal move is in progress. In contrast, if the location sensor indicates that the trailer is moving and the wheel monitoring unit indicates that the wheels are rotating, the processor determines that an intermodal move is not in progress. In addition, since an intermodal move is not in progress, the processor can deduce that a tractor is coupled to the trailer and moving the trailer.

A Global Positioning System (GPS) unit is used to provide data relating to the location and/or velocity of the trailer. If successive location reports are available, then position changes in successive location reports may be used rather than using GPS velocity data.

Signal information indicative of the wheel rotation status can be provided by anti-lock braking systems that are standard on trailers. Alternatively, an independent wheel rotation sensor is used to provide wheel rotation status.

In accordance with the invention, appropriate filters are applied to the GPS movement data to assure that the trailer movement and wheel status information is accurate. As a result, intermodal status errors caused by a small change in trail movement and wheel rotation status are eliminated.

Figure 1:
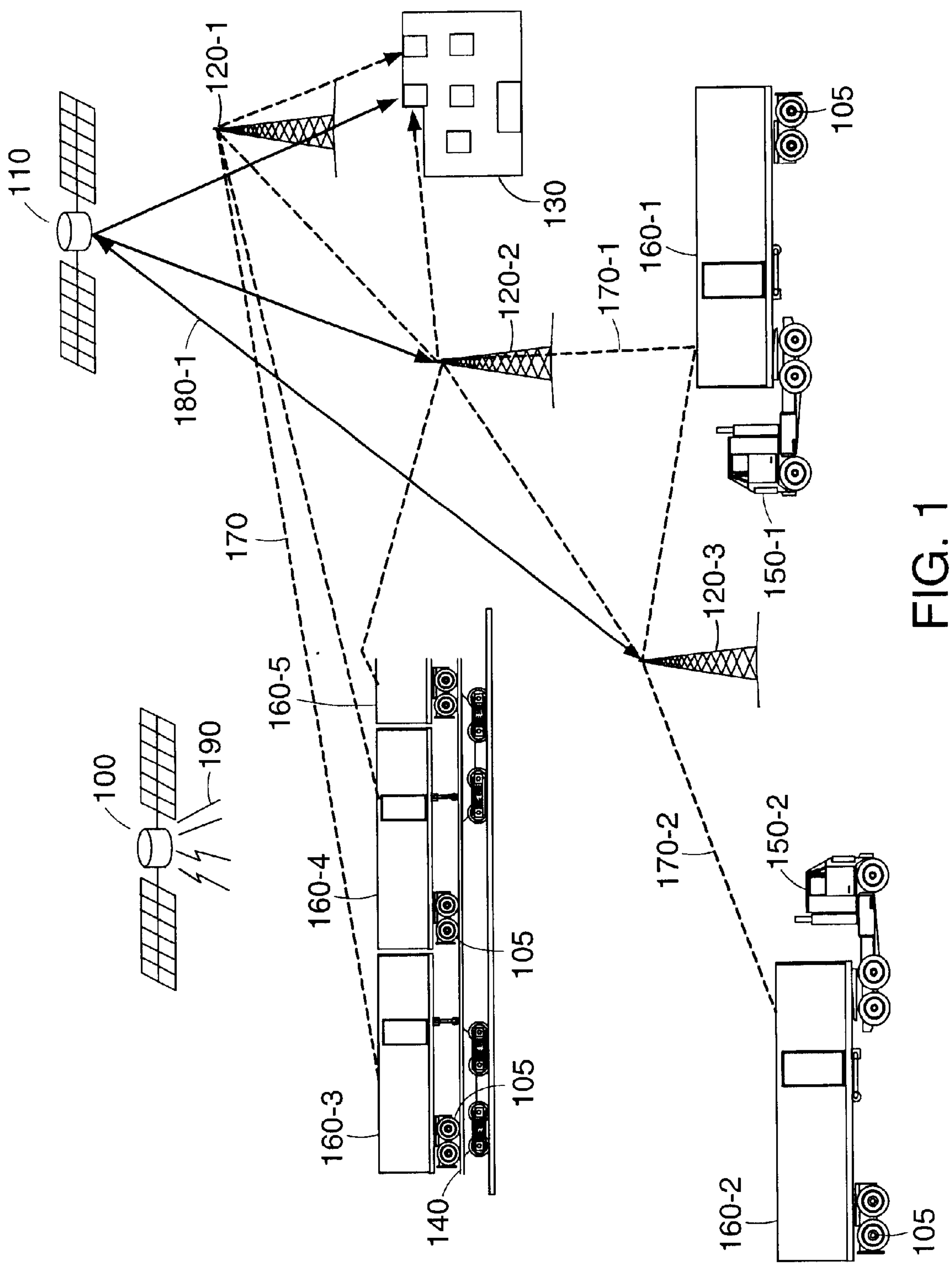
FIG. 1 is a diagram of a system for providing intermodal movement status of cargo trailers according to the invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Referring now to the drawings, FIG. 1 is a high level diagram of a system 10 for providing intermodal movement status of cargo trailers according to the invention. The system 10 includes trailers 160, railroad cars 140, tractors 150, a central station 130, and one or more GPS satellites 100. The system 10 makes use of a two-way communication system to permit the transmission of data to and from a radio subscriber unit 260 located on a cargo trailer 160 to a central hub station 130.

More specifically, the two-way communication system includes one or more communication satellites 110, satellite links 180, base stations 120, and base station links 170. The trailers 160 may transmit data signals 170 to the central station 130 via the base stations 120. The trailers 160 also communicate with the central station 130 via satellites 110 or a combination of satellites 110 and base stations 120.

Such a communication system may preferably be implemented according to U.S. Pat. No. 5,734,963 issued to Fitzgerald et al. and assigned to Terion, Inc., the assignee of the present application, which application is hereby incorporated by reference in its entirety. It has been suggested that this system can be used to track the location of shipping containers carried on ocean going vessels, as described in U.S. Pat. No. 5,995,804 issued to Rootsey et al., which application is also incorporated by reference herein in its entirety.

Other types of two-way communications systems, such as cellular telephone systems or two-way paging systems may be used to provide the wireless data links required between the trailers 160 and the central station 130.

In FIG. 1, some of the trailers 160 are on railroad cars 140 and the other trailers 160 are hauled by tractors 150. Although it is not illustrated in FIG. 1, it is understood that there exist parked trailers 160 that are not in service and thus not in transit.

Figure 2:
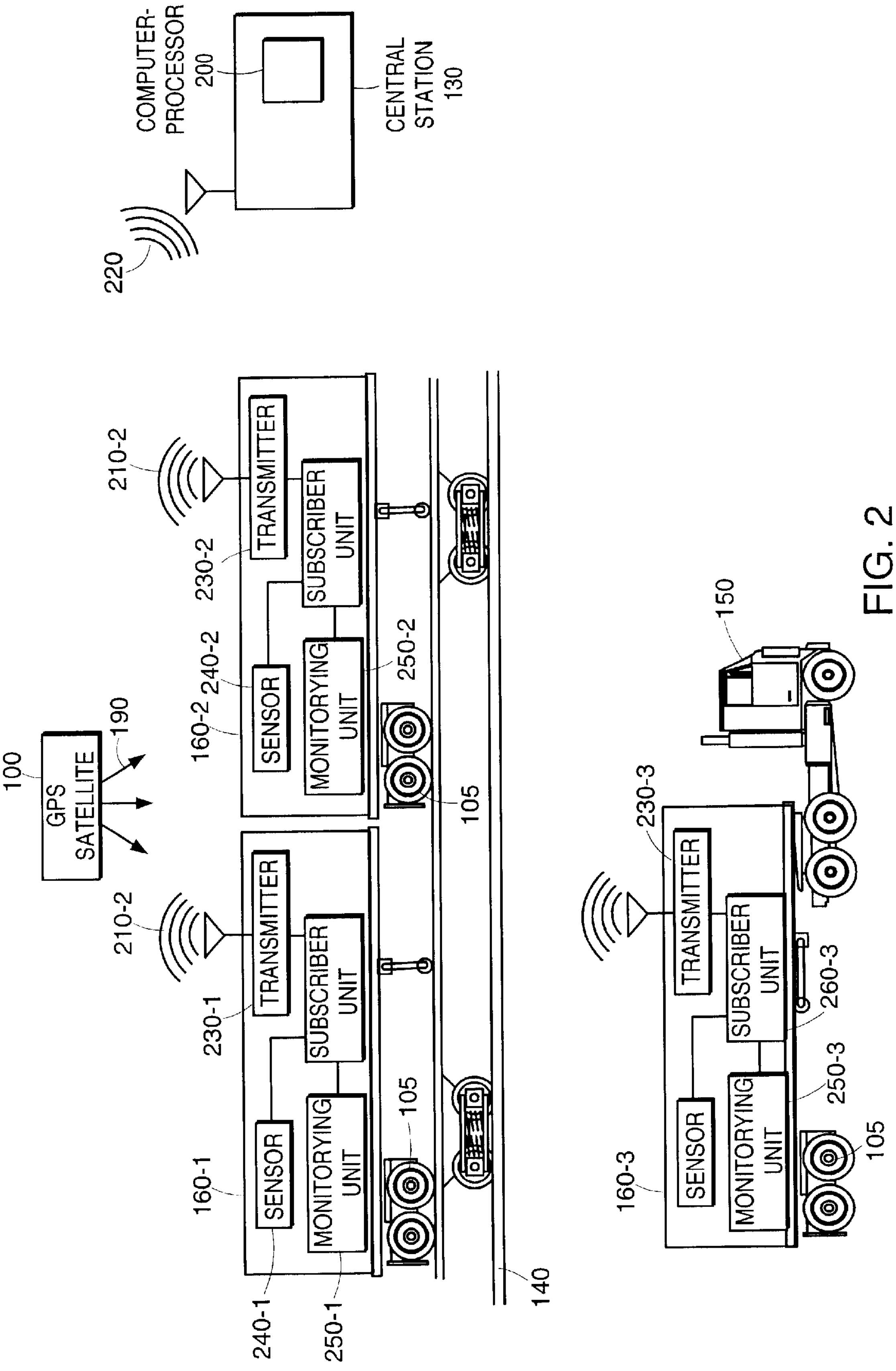
FIG. 2 is a block diagram showing in further detail the system for providing intermodal movement status as shown in FIG. 1.

FIG. 2 is a block diagram showing in further detail the system 10 for providing intermodal movement status as shown in FIG. 1. The trailer 160-2 includes a sensor 240-2 and a monitoring unit 250-2 both connected to a transmitter 230-2. The location sensor 240-2 provides data relating to the movement of the trailer 160. In particular, the location sensor 240-2, such as a GPS unit, provides position and velocity data. One or more GPS satellites 100 provides highly accurate navigation signals 190 which can be used to determine trailer location and velocity when the signals 190 are acquired by the GPS unit. The location sensor 240-2 is connected to the transmitter 230 to transmit the trailer movement data to the central station 130.

The transmitter 230-2 receives the trailer movement and wheel status data from the location sensor 240-2 and the monitoring unit 250-2. Then, the transmitter 230-2 transmits signals 210-1 to the central station 130.

The trailers 160-1 and 160-2 further include subscriber unit 260-1 and 260-2 that are connected to various sensors on the trailers160-1 and 160-2, to receive data indicating the status of the trailer and forwarding the trailer information data to the transmitters 230-1 and 230-2. The trailer information data provided by various senors include loaded/unloaded status, trailer door activity, and mileage.

The monitoring unit 250 monitors the status of one or more wheels 105. In particular, the monitoring unit 250 detects whether there is rotation of the wheels or not. The monitoring unit 250 is also connected to the transmitter 230 to transmit the wheel rotation data to the central station 130. An independent wheel rotation sensor may be used to detect rotation of the wheels 105.

The central station 130 receives the trailer information data signals 220 from the transmitter 230 and inputs the trailer data to a processor 200. The central station has a communication link to users, such as asset managers, to provide the intermodal status of each trailer in the fleet. The processor 200 determines the intermodal status of the trailers 160 using the trailer movement and wheel information. For example, if the location sensor 240 indicates that the trailer 160 is moving, but the wheels 105 are not rotating, then the system 10 determines that an intermodal move is in progress. Appropriate filters should preferably be applied to the GPS movement data to assure that the trailer movement and wheel status data is accurate. Furthermore, location reports from different sensors may be used rather than velocity data to provide the trailer movement data.

Figure 3A:
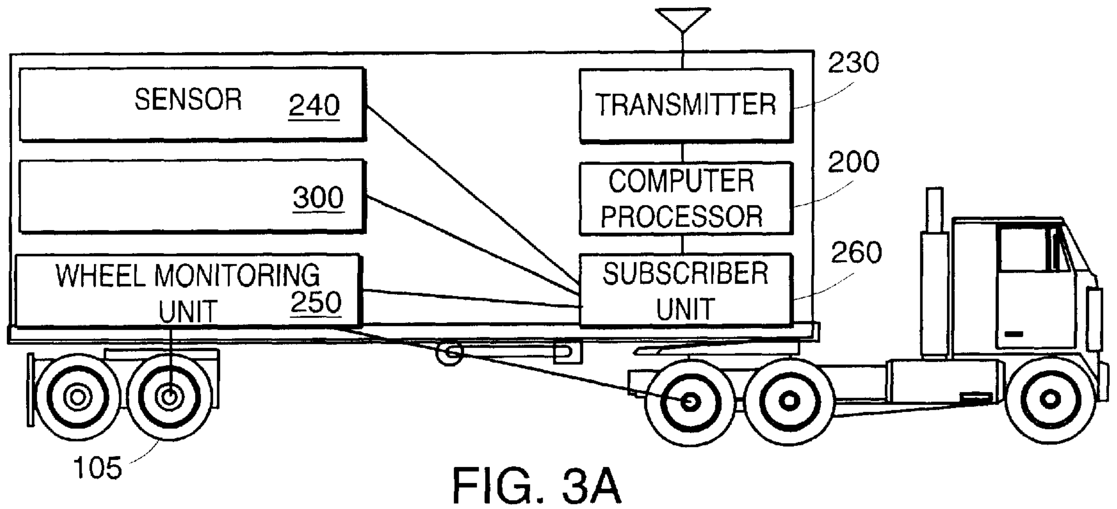
FIG. 3A is a block diagram of a cargo trailer including the processor shown in as FIG. 2.

FIG. 3A is a block diagram of the cargo trailer 160-4 including the processor 200. The cargo trailer 160-4 further includes the processor 200 connected to the subscriber unit 200 to receive the trailer movement and wheel status data and determine the intermodal status of the trailer 160-4. So, the intermodal status of the trailer 160-4 is determined by the processor at the trailer 160-4 and sends the intermodal status data to the transmitter 230-4 for transmitting to the central station 130.

Figure 3B:
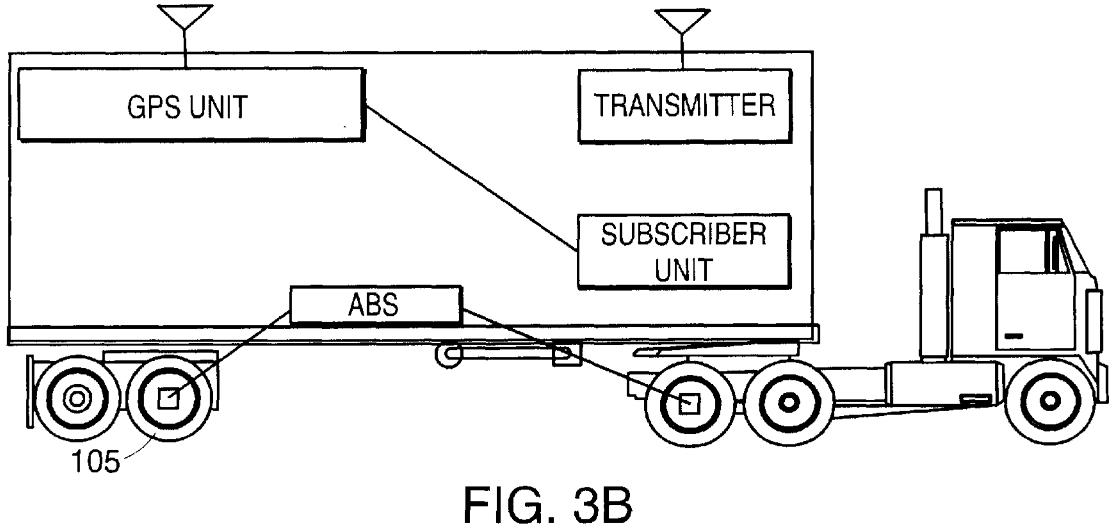
FIG. 3B is a block diagram of a cargo trailer using an anti-lock braking system and a global positioning system unit according to the invention.

FIG. 3B is a block diagram of the cargo trailer 160-5 using the anti-lock braking system 310 to detect rotation of the wheels. Besides an independent wheel sensor, the existing anti-lock braking system 310, which is becoming standard on trailers, can be used to detect rotation of the wheels 105. The anti-lock braking systems 310 include inductive wheel rotation speed senor system to control the anti-lock braking mechanism. Such a wheel rotation speed sensor used in anti-lock braking systems provides the wheel rotation status of the trailer 160-5.

Figure 4:
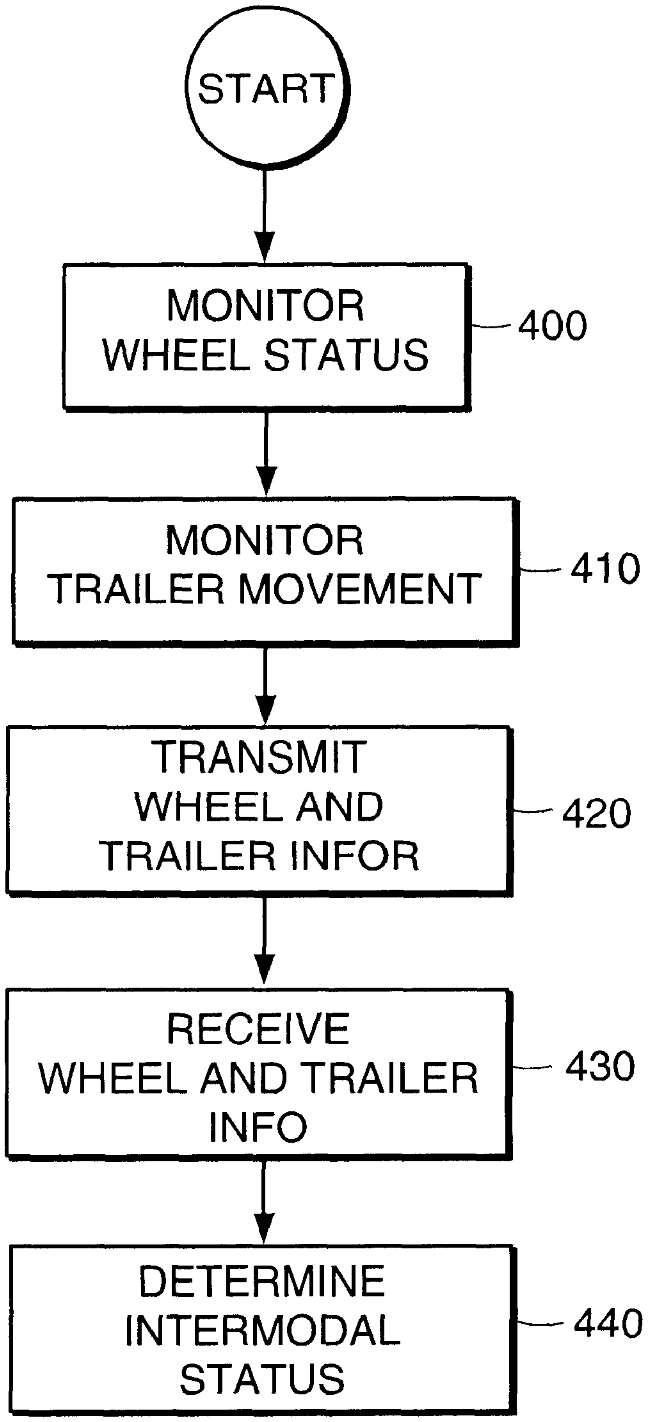
FIG. 4 is a flow chart of a method which may be performed in accordance with the invention.

The invention can also be implemented as a sequence of process steps as shown in FIG. 4. The steps may be carried out by the hardware components shown in FIGS. 1–3.

After an initial process step, a step 405 is performed where at least one of the wheels is monitored by the wheel monitoring unit 250. Control then passes to step 410.

In this step 410, the location sensor 240 provides the trailer movement data to the transmitter 230 and control passes to step 420.

In step 420, the trailer movement data and wheel status information is transmitted to the central station 130.

Control then proceeds to step 430, the central station 130 receives the trailer movement and wheel status data. Control then passes to step 440.

In step 440, the intermodal status of the trailer 160 is determined.

Although not shown, it is understood that step 440 can be performed where the intermodal status is determined at the trailer 160 and then proceed to step 420 where the intermodal status is transmitted to the central station 130. So that in step 430, the central station receives the intermodal status data.

Figure 5:
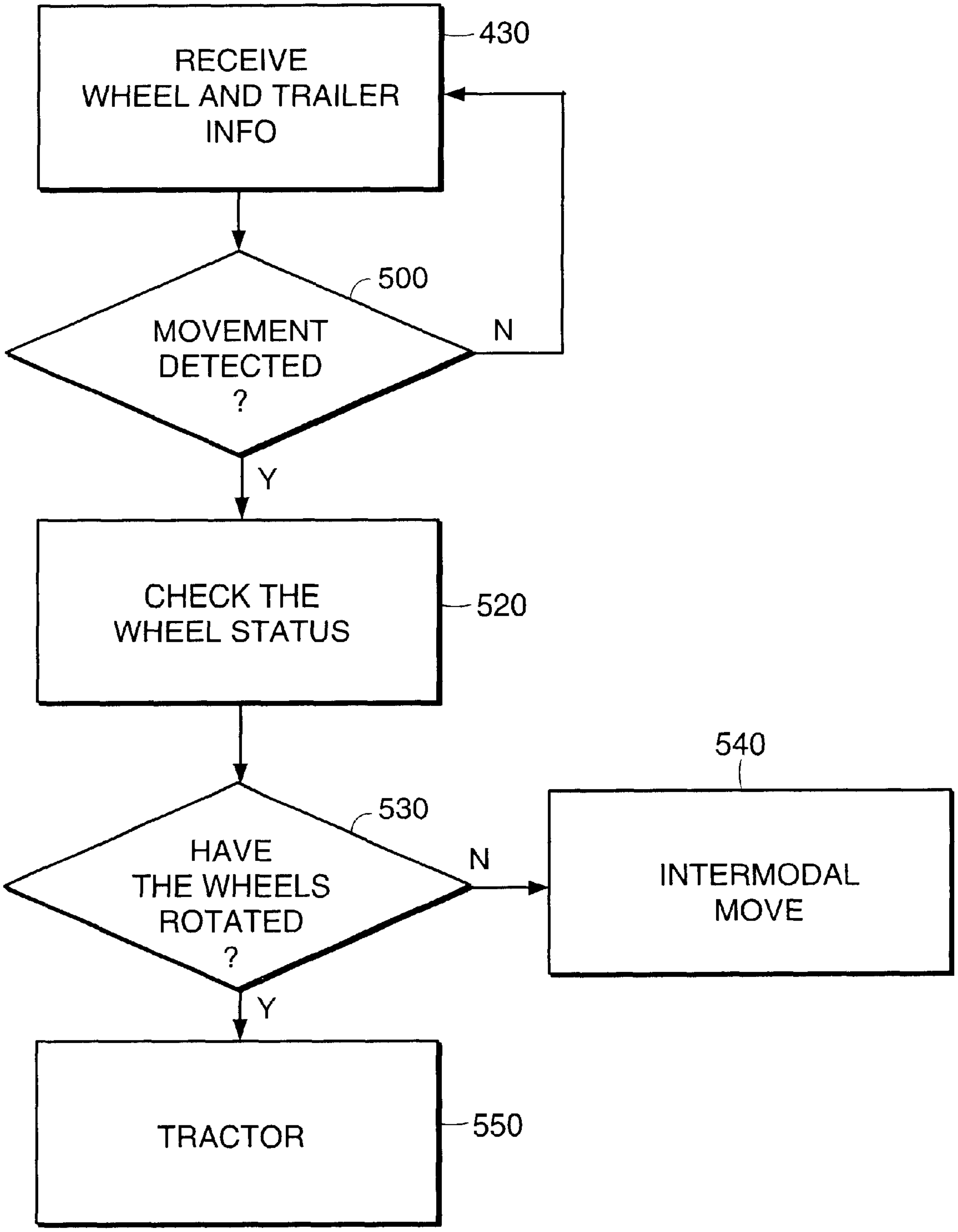
FIG. 5 is a flow chart of the operations performed by the processor to determine the intermodal movement status of the trailer as shown in FIGS. 1–3.

FIG. 5 is a flow chart of the operations performed by a processor 200 to determine the intermodal movement status of the trailer as shown in FIG. 4.

As described above, in step 430, the central station receives the trailer movement and wheel status data and control passes to step 500.

In this step 500, if movement of the trailer is detected then control passes to step 520. If no movement is detected then control returns to step 430.

In step 520, the computer processor 200 checks rotation of the wheels. Control passes to step 530.

In step 520, if the wheels have rotated then control passes to step 550. If the wheels have not rotated then control passes to step 540.

In step 540, it is determined that the intermodal move is in progress.

In step 550, it is determined that the intermodal move is not in progress and the tractor 150 is hauling the trailer 160.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for tracking an monitoring intermodal status of a cargo trailer comprising:

a wheel status monitoring unit for monitoring the status of at least one wheel of the trailer;

a sensor for providing data relating to the movement of the trailer;

a central station for receiving trailer information data;

wireless radio communication equipment for transmitting trailer information data to the central station; and a processor for determining the intermodal status of the trailer.

2. A system as recited in claim 1 wherein the processor determines the intermodal status of the trailer by comparing the trailer movement and wheel information.

3. A system as recited in claim 1 wherein the data relating to the movement of the trailer includes position and velocity data of the trailer.

4. A system as recited in claim 1 wherein the data relating to the movement of the trailer is successive location reports.

5. A system as recited in claim 1 wherein the sensor is a Global Positioning System unit.

6. A system as recited in claim 1 wherein the trailer information data includes the trailer movement, wheel status and intermodal status information.

7. A system as recited in claim 1 wherein the processor is located at the trailer and connected to the sensor and the wheel status monitoring unit.

8. A system as recited in claim 1 wherein the processor is a micro processor located at the central station.

9. A system as recited in claim 1 further comprising a subscriber unit connected to the sensor and the wheel status monitoring unit for receiving the trailer movement and wheel information data and forwarding the data to the wireless radio communication equipment.

10. A system as recited in claim 1 wherein the wheel status monitoring unit is an anti-lock braking system.

11. A system as recited in claim 1 wherein the processor includes filtering means to filter the trailer information data for assuring the accuracy of the data.

12. A method for tracking and monitoring intermodal status of a cargo trailer comprising:

monitoring the status of at least one wheel of the trailer;

providing data relating to the movement of the trailer;

transmitting trailer information data to a central station;

receiving the trailer information data; and determining the intermodal status of the cargo trailer.

13. A method as recited in claim 12 wherein determining the intermodal status comprises comparing the wheel status information and the trailer movement data.

14. A method as recited in claim 12 wherein the data relating to the movement of the trailer includes position and velocity data of the trailer.

15. A method as recited in claim 12 wherein the data relating to the movement of the trailer is successive location reports.

16. A method as recited in claim 12 wherein providing data is performed by using a Global Positioning System unit.

17. A method as recited in claim 12 wherein the trailer information data includes the trailer movement, intermodal status and wheel status information.

18. A method as recited in claim 12 wherein determining the intermodal status is performed at the trailer.

19. A method as recited in claim 12 wherein determining the intermodal status is performed at the central station.

20. A method as recited in claim 12 further comprising, providing the trailer movement and wheel information data to a subscriber unit, and forwarding the data to wireless radio communication equipment for transmitting to the central station.

21. A method as recited in claim 12 wherein monitoring the status is performed by using an anti-lock braking system.

22. A method as recited in claim 12 wherein determining the intermodal status comprises filtering means to filter the trailer information data for assuring the accuracy of the data.

* * * * *